United States Patent
Song et al.

(10) Patent No.: US 12,311,315 B2
(45) Date of Patent: May 27, 2025

(54) STRUCTURED MONOLITH CATALYST FOR REDUCING NOX EMISSION IN FLUE GAS, PREPARATION METHOD AND APPLICATIONS THEREOF

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Haitao Song, Beijing (CN); Qiuqiao Jiang, Beijing (CN); Huiping Tian, Beijing (CN); Wei Lin, Beijing (CN); Jiasong Yan, Beijing (CN); Peng Wang, Beijing (CN); Jiushun Zhang, Beijing (CN); Zhijian Da, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 280 days.

(21) Appl. No.: 17/415,179

(22) PCT Filed: Dec. 17, 2019

(86) PCT No.: PCT/CN2019/125883
§ 371 (c)(1),
(2) Date: Jun. 17, 2021

(87) PCT Pub. No.: WO2020/125609
PCT Pub. Date: Jun. 25, 2020

(65) Prior Publication Data
US 2022/0054977 A1 Feb. 24, 2022

(30) Foreign Application Priority Data
Dec. 20, 2018 (CN) .......................... 201811565816.3

(51) Int. Cl.
| | |
|---|---|
| *B01D 53/86* | (2006.01) |
| *B01J 6/00* | (2006.01) |
| *B01J 23/89* | (2006.01) |
| *B01J 35/56* | (2024.01) |
| *B01J 37/02* | (2006.01) |

(52) U.S. Cl.
CPC .......... *B01D 53/8628* (2013.01); *B01J 6/001* (2013.01); *B01J 23/8986* (2013.01); *B01J 35/56* (2024.01); *B01J 37/0215* (2013.01); *B01D 2255/1026* (2013.01); *B01D 2255/2047* (2013.01); *B01D 2255/2073* (2013.01); *B01D 2255/20738* (2013.01); *B01D 2255/20746* (2013.01); *B01D 2255/2092* (2013.01); *B01D 2257/404* (2013.01); *B01D 2258/0283* (2013.01)

(58) Field of Classification Search
None
See application file for complete search history.

(56) References Cited

U.S. PATENT DOCUMENTS

| | | | |
|---|---|---|---|
| 4,755,282 A | | 7/1988 | Samish et al. |
| 5,021,144 A | | 6/1991 | Altrichter |
| 6,610,264 B1 | * | 8/2003 | Buchanan ........... C01B 17/0408 423/244.01 |
| 2005/0028518 A1 | * | 2/2005 | Li ......................... F01N 3/0814 60/300 |
| 2015/0273452 A1 | * | 10/2015 | Chiffey ................ B01J 37/0244 502/66 |

FOREIGN PATENT DOCUMENTS

| | | | |
|---|---|---|---|
| CA | 2263781 | * | 9/1998 |
| CN | 1218420 | * | 6/1999 |
| CN | 1199733 C | | 5/2005 |
| CN | 1986058 A | | 6/2007 |
| CN | 101024179 A | | 8/2007 |
| CN | 101422736 A | | 5/2009 |
| CN | 101422735 B | | 12/2010 |
| CN | 102371150 A | | 3/2012 |

(Continued)

OTHER PUBLICATIONS

Fickel, Dustin W. et al.; "The Ammonia Selective Catalytic Reduction Activity of Copper-Exchanged Small-Pore Zeolites"; Applied Catalysis B: Environmental; vol. 102, No. 3; Year: 2011; pp. 441-448.
Contact to:Yamada, N.;"Cordierite honeycomb for automobile exhaust gas purification (1976-the current)"; Ceramics Archives; vol. 42, No. 9; Year: 2007; pp. 680-682.

*Primary Examiner* — Sheng H Davis
(74) *Attorney, Agent, or Firm* — NKL Law; Allen Xue (57) ABSTRACT

A structured monolithic catalyst has a structured monolithic carrier and a coating of active components. The coating of active components comprises active metal components and a substrate. The active metal components conclude a first metal element, a second metal element, a third metal element and a fourth metal element. The first metal element includes Fe and Co; the second metal element is at least one selected from the group consisting of the metal elements of the Group IA and/or IIA; the third metal element is at least one selected from the group consisting of the non-noble metal elements of the Groups IB to VIIB; and the fourth metal element is at least one selected from the group consisting of the noble metal elements.

15 Claims, 1 Drawing Sheet

(56) References Cited

FOREIGN PATENT DOCUMENTS

| | | | |
|---|---|---|---|
| CN | 105562031 | * | 5/2016 |
| CN | 106268793 | A | 1/2017 |
| JP | H0549931 | A | 3/1993 |
| JP | H08206500 | A | 8/1996 |
| JP | H08323205 | A | 12/1996 |
| JP | 2012050980 | * | 3/2012 |
| KR | 20050065616 | A | 6/2005 |
| RU | 2640411 | C2 | 1/2018 |
| SU | 1657048 | A3 | 6/1991 |
| WO | 2019007381 | A1 | 1/2019 |

* cited by examiner

STRUCTURED MONOLITH CATALYST FOR REDUCING NOX EMISSION IN FLUE GAS, PREPARATION METHOD AND APPLICATIONS THEREOF

TECHNICAL FIELD

The invention generally relates to the field of catalytic cracking, particularly to a structured monolithic catalyst for reducing NOx emission in a flue gas, the preparation method and the use thereof, as well as a method for treating an incomplete regeneration flue gas.

BACKGROUND

The continuous rising of the price of crude oil greatly increases the processing cost of a refinery. As a response, on the one hand, the refinery may reduce the cost by purchasing low-price inferior oil; on the other hand, economic benefits may be accumulated by deeply processing heavy oils. Catalytic cracking is an important means for processing heavy oils in a refinery and plays an important role in the refinery. It is not only the main measure for balancing heavy oils and producing clean fuels in the refinery, but also the key for energy conservation and efficiency enhancement in the refinery. However, catalytic cracking is a fast catalytic reaction system associated with quick deactivation of catalysts. Accordingly, to find a solution for catalyst regeneration is always the main work for the development of catalytic cracking.

In a process of a fluidized catalytic cracking (FCC), the feed oil and a (regenerated) catalyst are quickly contacted in a riser to carry out catalytic cracking reaction. The coke formed in the reaction deposits on the catalyst and makes it deactive. The catalyst deactivated by the formed coke is stripped and then enters a regenerator in which it contacts with air or an oxygen-enriching air for regeneration which enters the regenerator from the bottom, to carry out the regeneration by burning the coke. The regenerated catalyst is circulated back to the reactor to participate in the catalytic cracking reaction again. Based on the excess oxygen content in the flue gas from the regeneration process (hereinafter referred to as "regeneration flue gas") or the degree of oxidation of CO, the catalytic cracking device can be divided into those with regeneration operated in a complete combustion mode and those with regeneration operated in an incomplete combustion mode (hereinafter referred to as "a complete regeneration catalytic cracking device" and "an incomplete regeneration catalytic cracking device" respectively).

In regeneration operated in a complete combustion mode, the coke and the nitrogen-containing compounds in the coke form $CO_2$ and $N_2$ under the action of the air for regeneration. At the same time, pollutants such as CO, NOx and the like are formed. Using a promoter is an important technical measure for controlling CO and NOx emissions.

The promoter for reducing NOx emission in a flue gas (regeneration flue gas, also referred to as regenerator off gas or regenerator effluent) is generally called a NOx emission reduction promoter or a NOx reduction promoter. For example, CN102371150A discloses a non-noble metal composition for reducing NOx emission in the regeneration flue gas from a catalytic cracking unit, wherein the composition has a bulk density of no more than 0.65 g/mL and comprises, calculated as oxide, (1) 50-99% by weight of an inorganic oxide carrier, (2) 0.5-40% by weight of one or more selected from the group consisting of non-noble metal elements of Group IIA, IIB, IVB and VIB, and (3) 0.5-30% by weight of a rare earth element, based on the weight of the composition. When used in FCC, the composition can significantly reduce NOx emission in the regeneration flue gas.

In regeneration operated in an incomplete combustion mode, the regeneration flue gas at the outlet of regenerator may have a low content of excess oxygen and a high concentration of CO, as well as a very low concentration of NOx but a high concentration of reduced nitrides such as $NH_3$, HCN and the like. Those reduced nitrides flow downstream along with the flue gas to a CO burner for energy recovery, in which, if they are fully oxidized, NOx is formed; and if they are not fully oxidized, the remaining $NH_3$ and the like may easily cause the ammonia-nitrogen in the downstream scrubber waste water to exceed the standard, or react with SOx in the flue gas to generate ammonium salt precipitates, which may cause salt deposition in the exhaust heat boiler or other flue gas post-treatment equipment (such as SCR), affecting the long-term operation of the device. Therefore, a promoter is used in the flue gas from regeneration operated in an incomplete combustion mode (hereinafter referred to as "an incomplete regeneration flue gas") to catalyze the conversion of $NH_3$ and the like, so that the NOx emission in the flue gas may be reduced and the operation period of the device may be prolonged.

U.S. Pat. No. 5,021,144 discloses a method for reducing $NH_3$ emission in the flue gas from an incomplete regeneration FCC device, wherein a CO combustion promoter is added into the regenerator in an excessive amount which is 2-3 times of the minimum quantity necessary to prevent the dilute phase bed from afterburning. Though such method can reduce $NH_3$ emission in the flue gas from an incomplete regeneration FCC device, high amount of CO is used, which has the defect of high energy consumption and is not in favor of environmental protection.

U.S. Pat. No. 4,755,282 discloses a method for reducing $NH_3$ emission in the flue gas from a partial or incomplete regeneration FCC device, wherein an ammonia decomposition catalyst with a particle size of 10-40 µm is added into the regenerator and maintained at a certain concentration in the dilute phase bed to convert $NH_3$ into $N_2$ and water. The active components of the ammonia decomposition catalyst may be a noble metals dispersed on an inorganic oxide carrier.

CN101024179A discloses a composition for reducing NOx used in a FCC process, comprising (i) an acidic metal oxide substantially free of zeolite, (ii) an alkali metal, an alkali earth metal or a mixture thereof, and (iii) an oxygen storage component. The composition prepared by impregnation of a noble metal is used to convert the gaseous reduced nitrogen containing substances in the flue gas from an incomplete regeneration catalytic cracking device and thereby to reduce the NOx emission in the flue gas.

Currently, there are relatively few reports on the research and the use of the catalyst for controlling $NH_3$ and NOx emissions in the regeneration flue gas from an incomplete regeneration catalytic cracking device. Because of the significantly difference in the composition of the regeneration flue gas between that from an incomplete regeneration catalytic cracking device and that from a complete regeneration catalytic cracking device, the existing promoters suitable for the complete regeneration catalytic cracking device do not have an ideal effect when used in the incomplete regeneration catalytic cracking device. Although the promoter compositions disclosed in the above-mentioned documents can catalyze the conversion of reduced nitrides such as $NH_3$ and the like in the regeneration flue gas to a certain extent, the catalytic conversion activity for the reduced nitrides such as $NH_3$ and the like in the flue gas still needs to be further improved, so as to reduce the impact of the salt deposition from $NH_3$ and the like on the operation of the equipment. Therefore, there is a demand to develop a catalyst system suitable for reducing pollutant emission in the regeneration flue gas from an incomplete regeneration catalytic cracking device to further reduce NOx emission in the regeneration flue gas.

SUMMARY OF THE INVENTION

To solve the defects of low catalytic conversion activity for the reduced nitrides such as $NH_3$ and the like in reducing pollutant emission in the regeneration flue gas of the prior art, especially in reducing pollutant emission in the incomplete regeneration flue gas, the present invention provides a structured monolithic catalyst for reducing NOx emission in a flue gas, the preparation method and use thereof, as well as a method for treating an incomplete regeneration flue gas. The structured monolithic catalyst for reducing NOx emission in flue gas in accordance with the present invention has high catalytic conversion activity for reduced nitrides. It is obtainable by a simple method. When used in a FCC process, it can effectively reduce NOx emission in the incomplete regeneration flue gas.

To achieve the above objects, in the first aspect in accordance with the present invention, it is provided a structured monolithic catalyst for reducing NOx emission in flue gas, comprising: a structured monolithic carrier and a coating of active components disposed on inner surface and/or outer surface of the structured monolithic carrier, wherein, based on the total weight of the catalyst, the coating of active components is presented in an amount of about 1-50 wt %, wherein the coating of active components comprises active metal components and a substrate, wherein the active metal components comprise a first metal element, a second metal element, a third metal element and a fourth metal element, wherein the first metal element is selected from the group consisting of the non-noble metal elements of the Group VIII, wherein the first metal element includes Fe and Co, and wherein the weight ratio of Fe and Co is 1:(0.05-20) on an oxide basis, wherein the second metal element is at least one selected from the group consisting of the metal elements of the Group IA and/or IIA, wherein the third metal element is at least one selected from the group consisting of the non-noble metal elements of the Groups IB to VIIB, and wherein the fourth metal element is at least one selected from the group consisting of the noble metal elements. Preferably, based on the total weight of the catalyst, the coating of active ingredients is presented in an amount of about 10-50 wt %, about 15-40 wt %, about 20-35 wt %, about 2-30 wt %, about 5-25 wt %, or about 7-20 wt %.

Preferably, on an oxide basis, the weight ratio of Fe and Co is about 1:(0.1-10), preferably about 1:(0.3-3), further preferably about 1:(0.5-2), most preferably about 1: (0.6-1).

In the second aspect in accordance with the present invention, it is provided a method for preparing a structured monolithic catalyst for reducing NOx emission in flue gas, comprising: in the first scheme:
 (1) making a slurry by mixing a source of a substrate, a precursor of a first metal element, a precursor of a second metal element, a precursor of a third metal element, a precursor of a fourth metal element, and water, to obtain a coating slurry of active components, and
 (2) coating a structured monolithic carrier with the coating slurry of active components, and then subjected to drying and the first calcining, to obtain the coating of active components disposed on inner surface and/or outer surface of the structured monolithic carrier, or in the second scheme
 a) making a slurry by mixing a source of a substrate, a precursor of a first metal element, a precursor of a second metal element, a precursor of a third metal element, and water, to obtain a first slurry,
 b) coating a structured monolithic carrier with the first slurry, and then subjected to drying and the second calcining, to form a coating comprising parts of active components on inner surface and/or outer surface of the structured monolithic carrier, to obtain a semi-finished catalyst, and
 c) coating the semi-finished catalyst obtained in the step b) with a solution comprising a precursor of a fourth metal element, and then subjected to drying and/or the third calcining, to obtain the coating of active components disposed on inner surface and/or outer surface of the structured monolithic carrier,
 wherein the first metal element is selected from the group consisting of the non-noble metal elements of the Group VIII, wherein the first metal element includes Fe and Co, wherein 5 the second metal element is at least one selected from the group consisting of the metal elements of the Group IA and/or IIA, wherein the third metal element is at least one selected from the group consisting of the non-noble metal elements of the Groups IB to VIIB, and wherein the fourth metal element is at least one selected from the group consisting of the noble metal elements, and
 wherein the precursor of the first metal element comprises precursor of Fe and precursor of Co in an amount so that the obtained catalyst comprises, on an oxide basis, Fe and Co in a weight ratio of 1:(0.05-20).

In the third aspect in accordance with the present invention, it is provided a structured monolithic catalyst for reducing NOx emission in flue gas, prepared by the above method.

In the fourth aspect in accordance with the present invention, it is provided a use of the structured monolithic catalyst for reducing NOx emission in flue gas in treating an incomplete regeneration flue gas from a catalytic cracking process.

In the fifth aspect in accordance with the present invention, it is provided a method for treating an incomplete regeneration flue gas, comprising the step of contacting the incomplete regeneration flue gas with a catalyst, wherein the catalyst is the structured monolithic catalyst for reducing NOx emission in flue gas in accordance with the present invention as mentioned above.

Preferably, the contacting is carried out in a CO burner and/or in a flue gas channel before the CO burner, more preferably the contacting is carried out in the flue gas channel before the CO burner.

As compared with the prior art, the structured monolithic catalyst for reducing NOx emission in flue gas in accordance with the present invention has the following technical effects.
 (1) In the structured monolithic catalyst, special active components are in form of a coating disposed on inner surface and/or outer surface of the structured monolithic catalyst. Accordingly, the active components in the coating have high dispersity, which substantially improves the catalytic conversion activity for the reduced nitrides such as $NH_3$ and the like;

(2) The present application provides a method for treating an incomplete regeneration flue gas, which uses the structured monolithic catalyst in accordance with the present invention. It substantially improves the catalytic conversion activity for the reduced nitrides such as $NH_3$ and the like, and thereby can efficiently reduce NOx emission in an incomplete regeneration flue gas. Preferably, the contacting of the catalyst with the incomplete regeneration flue gas is carried out in a CO burner and/or in a flue gas channel before the CO burner, more preferably in the flue gas channel before the CO burner. Such arrangements are more advantageous for improving the catalytic conversion activity for the reduced nitrides such as $NH_3$ and the like, without any impact on FCC product distribution.

BRIEF DESCRIPTION OF THE DRAWINGS

The accompanying drawings are included to provide a further understanding of the invention and are a part of this specification, which, together with the following detail description of the technology, illustrate embodiments of the invention but not intend to limit the scope thereof. In the drawings.

DETAIL DESCRIPTION

It should be understood that the endpoints and any values in the ranges disclosed herein are not limited to the precise range or value, but to encompass values close to those ranges or values. For ranges of values, it is possible to combine between the endpoints of each of the ranges, between the endpoints of each of the ranges and the individual points, and between the individual points to give one or more new ranges of values as if these ranges of values are specifically disclosed herein. As used in the description and the claims, the singular forms "a," "an," and "the" may be intended to include the plural forms as well, unless the context clearly indicates otherwise.

As used herein, the term "a structured monolithic catalyst" refers to a catalyst comprising a structured monolithic carrier and a coating of active components disposed on inner surface and/or outer surface of the structured monolithic carrier; and the term "a structured monolithic carrier" refers to a carrier having a monolithic structure.

In the first aspect in accordance with the present invention, it is provided a structured monolithic catalyst for reducing NOx emission in flue gas, comprising: a structured monolithic carrier and a coating of active components disposed on inner surface and/or outer surface of the structured monolithic carrier, wherein, based on the total weight of the catalyst, the coating of active components is presented in an amount of about 1-50 wt %, wherein the coating of active components comprises active metal components and a substrate, wherein the active metal components comprise a first metal element, a second metal element, a third metal element and a fourth metal element, wherein the first metal element is selected from the group consisting of the non-noble metal elements of the Group VIII, wherein the first metal element includes Fe and Co, wherein the weight ratio of Fe and Co is 1:(0.05-20) on an oxide basis, wherein the second metal element is at least one selected from the group consisting of the metal elements of the Group IA and/or IIA, wherein the third metal element is at least one selected from the group consisting of the non-noble metal elements of the Groups IB to VIIB, and wherein the fourth metal element is at least one selected from the group consisting of the noble metal elements.

In the structured monolithic catalyst in accordance with the present invention, active components, i.e. the first metal element (including Fe and Co), the second metal element, the third metal element and the fourth metal element, are in form of a coating of active components disposed on inner surface and/or outer surface of the structured monolithic catalyst. Accordingly, the active components in the coating have high dispersity, which substantially improves the catalytic conversion activity for the reduced nitrides such as $NH_3$ and the like;

In one preferable embodiment in accordance with the present invention, based on the total weight of the catalyst, the coating of active components is presented in an amount of at least about 1 wt %, at least about 2 wt %, at least about 3 wt %, at least about 4 wt %, at least about 5 wt %, at least about 10 wt %, at least about 15 wt %, at least about 20 wt %, and the like, and up to about 50 wt %, up to about 45 wt %, up to about 40 wt %, up to about 35 wt %, up to about 30 wt %, up to about 25 wt %, up to about 20 wt %, up to about 15 wt %, and the like. Preferably, based on the total weight of the catalyst, the coating of active components is presented in an amount of, for example, about 1-50 wt %, about 2-50 wt %, about 5-50 wt %, about 10-50 wt %, about 15-40 wt %, preferably about 20-35 wt %, further preferably about 20-30 wt %. In one variant, based on the total weight of the catalyst, the coating of active components is presented in an amount of about 2-30 wt %, about 5-25 wt %, or about 7-20 wt %.

In the structured monolithic catalyst in accordance with the present invention, preferably, based on the total weight of the coating of active components, the substrate is in an amount of 10-90 wt %, and on an oxide basis, the first metal element is in an amount of 0.5-50 wt %, the second metal element is in an amount of 0.5-20 wt %, the third metal element is in an amount of 0.5-20 wt %, and on an element basis, the fourth metal element is in an amount of 0.001-0.15 wt %.

Further preferably, based on the total weight of the coating of active components, the substrate is in an amount of 50-90 wt %, and on an oxide basis, the first metal element is in an amount of 3-30 wt %, the second metal element is in an amount of 1-20 wt %, the third metal element is in an amount of 1-10 wt %, and on an element basis, the fourth metal element is in an amount of 0.005-0.1 wt %.

Further more preferably, based on the total weight of the coating of active components, the substrate is in an amount of 55-85 wt %, and on an oxide basis, the first metal element is in an amount of 5-25 wt %, the second metal element is in an amount of 5-15 wt %, the third metal element is in an amount of 2-8 wt %, and on an element basis, the fourth metal element is in an amount of 0.01-0.08 wt %.

Most preferably, based on the total weight of the coating of active components, the substrate is in an amount of 66-85 wt %, and on an oxide basis, the first metal element is in an amount of 6-16 wt %, the second metal element is in an amount of 5-12 wt %, the third metal element is in an amount of 3-8 wt %, and on an element basis, the fourth metal element is in an amount of 0.05-0.07 wt %.

Preferably, the mass ratio of the amount of the substrate on an oxide basis, the amount of the first metal element on an oxide basis, the amount of the second metal element on an oxide basis, the amount of the third metal element on an oxide basis, and the amount of the fourth metal element on an element basis is 10-90:0.5-50:0.5-20:0.5-20:0.001-0.15, preferably 50-90:3-30:1-20:1-10:0.005-0.1, more preferably 55-85:5-25:5-15:2-8:0.01-0.08, and further more preferably 66-85:6-16:5-12:3-8:0.05-0.07.

In the invention, the amount of each component in the structured monolithic catalyst is measured by X-ray fluorescence spectrometry (The Analytic Method of Petrochemicals (RIPP Experimental Method), Edited by Cuiding Yang, et. al., Science Press, 1990, the entire disclosure of which is incorporated herein by reference).

The first metal element of the invention includes Fe and Co. However, the invention does not exclude the cases wherein the first metal element also contains an element other than Fe and Co within the non-noble metal elements of the Group VIII, such as Ni.

In the invention, as long as Fe and Co are included in the first metal element, it is possible to improve the catalytic conversion activity of the catalyst on the reduced nitrides such as $NH_3$ and the like. In order to further take advantage of the synergistic effect of Fe and Co, it is preferred that the weight ratio of Fe to Co is 1:(0.1-10), more preferably 1:(0.3-3), further more preferably 1: (0.5-2), and most preferably 1: (0.6-1), on an oxide basis.

In the invention, unless specially indicated, the term "on an oxide basis" refers to "on basis of $Fe_2O_3$" for Fe, and to "on basis of $CO_2O_3$" for Co.

According to a preferred embodiment of the invention, at least part of Fe in the catalyst is presented in a form of iron carbide. Preferably, the iron carbide is $Fe_3C$ and/or $Fe_7C_3$. There is not any special limitation on the amount of iron carbide in the present invention. As long as iron carbide is presented, the performance of the structured monolithic catalyst can be efficiently improved.

According to a preferred embodiment of the invention, at least part of Co in the composition is presented in a form of elemental cobalt. There is not any special limitation on the amount of elemental cobalt in the present invention. As long as elemental cobalt is presented, the performance of the structured monolithic catalyst can be efficiently improved.

It should be noted that in the existing catalysts, most of the metal elements thereof are in oxidized state. In the process for preparing the inventive catalyst, it is preferably calcined under a carbon-containing atmosphere, so that a part of the iron oxides are converted into iron carbide, and/or, a part of the cobalt oxides are converted into elemental cobalt. The present inventor find that the presence of iron carbide and/or elemental cobalt can make the catalyst better promote the decomposition of the reduced nitrogen-containing compounds, reduce the formation of nitrogen oxides, and promote the reduction of nitrogen oxides to a certain degree.

Preferably, the XRD pattern of the structured monolithic catalyst in accordance with the present invention includes diffraction peaks at 2θ of 42.6°, 44.2° and 44.9°.

In particular, the diffraction peak at 2θ of 42.6° and 44.9° are the diffraction peaks for iron carbide; and the diffraction peaks at 2θ of 44.2° is the diffraction peak for elemental cobalt.

According to a preferred embodiment of the invention, in the XRD pattern of the inventive catalyst, the diffraction peak at 2θ of 44.9° is stronger than that at 2θ of 42.6°.

In the invention, the structured monolithic catalyst is measured on an X-ray diffractometer (Siemens D5005) to determine the structure. The conditions thereof included: Cu target, Kα radiation, solid detector, tube voltage of 40 k V, tube current of 40 mA.

In the invention, the metal elements of the Group IA include but are not limited to Na and/or K. The metal elements of the Group IIA include but are not limited to at least one of Mg, Ca, Sr and Ba. The non-noble metal elements of the Groups IB to VIIB refer to the non-noble metals in the Group IB to the Group VIIB in the periodic table of elements, including the non-noble metals of the Group IB, the metals of the Group IIB, the metals of the Group IIIB, the metals of the Group IVB, the metals of the Group VB, the metals of the Group VIB and the metals of the Group VIIB. In particular, the non-noble metal elements of the Groups IB to VIIB include but are not limited to at least one of Cu, Zn, Cd, Sc, Y, Ti, Zr, V, Nb, Cr, Mo, W, Mn, Re and rare earth elements. The rare earth elements include but are not limited to at least one of La, Ce, Pr, Nd, Pm, Sm and Eu. The noble metal elements include Au, Ag, Pt, Os, Ir, Ru, Rh and Pd.

Preferably, in the inventive structured monolithic catalyst, the second metal element is at least one selected from the group consisting of Na, K, Mg and Ca, preferably K and/or Mg, most preferably Mg.

Preferably, in the inventive structured monolithic catalyst, the third metal element is at least one selected from the group consisting of Cu, Zn, Ti, Zr, V, Cr, Mo, W, Mn and rare earth elements, preferably at least one selected from the group consisting of Zr, V, W, Mn, Ce and La, most preferably Mn.

Preferably, in the inventive structured monolithic catalyst, the fourth metal element is at least one selected from the group consisting of Pt, Ir, Pd, Ru and Rh, most preferably Ru.

According to the most preferred embodiment of the invention, when Fe, Co, Mg, Mn and Ru are used in combination as the active components, it is possible to substantially improve the catalytic conversion activity for the reduced nitrides such as $NH_3$ and the like of the structured monolithic catalyst. In addition, the structured monolithic catalyst may advantageously have better hydrothermal stability.

Preferably, the mass ratio of the amount of Fe on an oxide basis, the amount of Co on an oxide basis, the amount of Mg on an oxide basis, the amount of Mn on an oxide basis, and the amount of Ru on an element basis is 0.05-45:0.05-45:0.5-20:0.5-20:0.001-0.15, preferably 1-20:1-20:1-20:1-10:0.005-0.1, more preferably 1.5-15:1.5-15:5-15:2-8:0.01-0.08, further more preferably 2-10:2-10:5-12:3-8:0.05-0.07.

In the most preferable embodiment in accordance with the present invention, the catalyst comprises a structured monolithic carrier and a coating of active components disposed on inner surface and/or outer surface of the structured monolithic carrier, wherein, based on the total weight of the catalyst, the coating of active components is presented in an amount of about 2-50 wt %, wherein the coating of active components comprises F, Co, Mg, Mn, Ru and alumina, wherein the weight ratio of Fe and Co is 1:(0.5-2) on an oxide basis, wherein based on the total weight of the coating of active components, alumina is presented in an amount of about 66-85 wt %, and on an oxide basis, Fe and Co is presented in an total amount of about 6-16 wt %, Mg is presented in an amount of about 5-12 wt %, Mn is presented in an amount of about 3-8 wt %, and on an element basis, Ru is presented in an amount of about 0.05-0.07 wt %.

Preferably, in the structured monolithic catalyst in accordance with the present invention, the substrate is at least one selected from the group consisting of alumina, silica-alumina, zeolite, spinel, kaolin, diatomite, perlite and perovskite, preferably at least one selected from the group consisting of alumina, spinel and perovskite, and further preferably alumina.

In the structured monolithic catalyst in accordance with the present invention, the structured monolithic carrier may be used as a catalyst bed in a fixed bed reactor. The structured monolithic carrier can be a monolithic carrier body with hollow channels formed therein, wherein catalytic coating may be disposed on the inner wall of the channels and the space in the channels may be used as the flow space for fluids. Preferably, the structured monolithic carrier is selected from a monolithic carrier with parallel channels opened at both ends. The structured monolithic carrier may be a honeycomb monolithic carrier with opened pores in a honeycomb shape in the cross section (hereinafter referred to as honeycomb carrier).

Preferably, in the structured monolithic catalyst in accordance with the present invention, the structured monolithic carrier has a pore density in the cross section of about 20-900 pores/square inch, for example, about 20-300 pores/square inch. The structured monolithic carrier has an opening rate in the cross section of about 20-80%, preferably about 50-80%. The pores may be in regular shape or irregular shape. The shapes of the pores may be the same or different, and each pore may be in a square, an equilateral triangle, an equilateral hexagon, a circle or a corrugated shape.

Preferably, in the structured monolithic catalyst in accordance with the present invention, the structured monolithic carrier may be at least one selected from the group consisting of a cordierite honeycomb carrier, a mullite honeycomb carrier, a diamond honeycomb carrier, a corundum honeycomb carrier, a zirconium corundum honeycomb carrier, a quartz honeycomb carrier, a nepheline honeycomb carrier, a feldspar honeycomb carrier, an alumina honeycomb carrier and a metal alloy honeycomb carrier.

In the second aspect in accordance with the present invention, it is provided a method for preparing a structured monolithic catalyst for reducing NOx emission in flue gas, comprising:

in the first scheme:
(1) making a slurry by mixing a source of a substrate, a precursor of a first metal element, a precursor of a second metal element, a precursor of a third metal element, a precursor of a fourth metal element, and water, to obtain a coating slurry of active components, and
(2) coating a structured monolithic carrier with the coating slurry of active components, and then subjected to drying and the first calcining, to obtain the coating of active components disposed on inner surface and/or outer surface of the structured monolithic carrier, or in the second scheme
a) making a slurry by mixing a source of a substrate, a precursor of a first metal element, a precursor of a second metal element, a precursor of a third metal element, and water, to obtain a first slurry,
b) coating a structured monolithic carrier with the first slurry, and then subjected to drying and the second calcining, to form a coating comprising parts of active components on inner surface and/or outer surface of the structured monolithic carrier, to obtain a semi-finished catalyst, and
c) coating the semi-finished catalyst obtained in the step b) with a solution comprising a precursor of a fourth metal element, and then subjected to drying and/or the third calcining, to obtain the coating of active components disposed on inner surface and/or outer surface of the structured monolithic carrier, wherein the first metal element is selected from the group consisting of the non-noble metal elements of the Group VIII, wherein the first metal element includes Fe and Co, wherein the second metal element is at least one selected from the group consisting of the metal elements of the Group IA and/or IIA, wherein the third metal element is at least one selected from the group consisting of the non-noble metal elements of the Groups IB to VIIB, and wherein the fourth metal element is at least one selected from the group consisting of the noble metal elements, and wherein the precursor of the first metal element comprises precursor of Fe and precursor of Co in an amount so that the obtained catalyst comprises, on an oxide basis, Fe and Co in a weight ratio of 1:(0.05-20).

In the method in accordance with the present invention, it is possible to mix the precursor of the first metal element, the precursor of the second metal element, the precursor of the third metal element, and the precursor of the fourth metal element into a slurry and then coat the structured monolithic carrier. It is also possible to mix the precursor of the first metal element, the precursor of the second metal element, and the precursor of the third metal element into a slurry and coat the structured monolithic carrier, and then further coat with the precursor of the fourth metal element. Both the two embodiments can achieve the effects desired in the present invention. In order to further improve the performance of the structured monolithic catalyst, the second scheme is preferred. The catalyst prepared in the second scheme in accordance with the present invention has better dispersion of the fourth metal element (precious metal) and thereby improved use efficiency of the noble metal elements.

In the invention, the precursor of the substrate in the first scheme may be any materials from which the substrate is obtainable under the conditions of the first calcining in step (2). The precursor of the substrate in the second scheme may be any materials from which the substrate is obtainable under the conditions of the second calcining in step b) and/or the third calcining in step c). There is not any special limitation on it in the invention. The type of suitable substrate may be those described above and is not described here again. When the substrate is preferably alumina, the source of the substrate may be a precursor of alumina. For examiner, the source of the substrate may be at least one selected from the group consisting of gibbsite, paialuminite, nuoshui aluminite, diaspore, boehmite and pseudo boehmite, and most preferably, pseudo boehmite.

Preferably, in the method in according to the present invention, before making the slurry, the source of the substrate may be treated by acidic peptization. The acidic peptization may be carried out according to the conventional means in the art. Further preferably, the acid used in the acidic peptization is hydrochloric acid In the invention, the conditions for the acidic peptization may be selected in a broad scope. Preferably, the acidic peptization may be performed with a ratio of acid to alumina of 0.12-0.22:1 for about 10-40 min.

In the invention, unless specially indicated, the ratio of acid to alumina refers to the mass ratio of hydrochloric acid in terms of concentrated hydrochloric acid having a concentration of 36 wt % to the precursor of alumina in dry basis.

In the invention, the precursor of the first metal element, the precursor of the second metal element, the precursor of the third metal element and the precursor of the fourth metal element are selected respectively from water-soluble salts of the first metal element, the second metal element, the third metal element and the fourth metal element, such as nitrates, chlorides, chlorates or sulfates and the like. There is not any special limitation on it in the invention.

In the method in accordance with the present invention, the structured monolithic carrier, the first metal element, the second metal element, the third metal element and the fourth metal element may be selected as disclosed above and are not described here again.

In the invention, each of the coating slurry of active components in the first scheme and the first slurry in the second scheme may have a solid content of about 8-30 wt %.

In the invention, in the second scheme, the solution comprising the precursor of the fourth metal element has a mass concentration of about 0.03-3 wt % on the fourth metal element basis. In the method in accordance with the present invention, in the first scheme, there is not any special limitation on the method for making a slurry by mixing the source of the substrate, the precursor of the first metal element, the precursor of the second metal element, the precursor of the third metal element, the precursor of the fourth metal element and water. There is not any special limitation on the order of adding the source of the substrate, the precursor of the first metal element, the precursor of the second metal element, the precursor of the third metal element, and the precursor of the fourth metal element, as long as the source of the substrate, the precursor of the first metal element, the precursor of the second metal element, the precursor of the third metal element and the precursor of the fourth metal element contact with water. Preferably, the precursor of the first metal element, the precursor of the third metal element and the precursor of the fourth metal element are dissolved in water, to which the source of the substrate is added (preferably the source of the substrate is acidized) to obtain a first solution. The precursor of the second metal element is mixed with water to obtain a second solution. The first solution and the second solution are mixed to obtain the slurry.

In the method in accordance with the present invention, in the second scheme, there is not any special limitation on the method for making a slurry by mixing the source of the substrate, the precursor of the first metal element, the precursor of the second metal element, the precursor of the third metal element and water. There is not any special limitation on the order of adding the source of the substrate, the precursor of the first metal element, the precursor of the second metal element, and the precursor of the third metal element, as long as the source of the substrate, the precursor of the first metal element, the precursor of the second metal element, and the precursor of the third metal element contact with water. Preferably, the precursor of the first metal element and the precursor of the third metal element are dissolved in water, to which the source of the substrate is added (preferably the source of the substrate is acidized) to obtain a first solution. The precursor of the second metal element is mixed with water to obtain a second solution. The first solution and the second solution are mixed to obtain the slurry.

Figure 1:
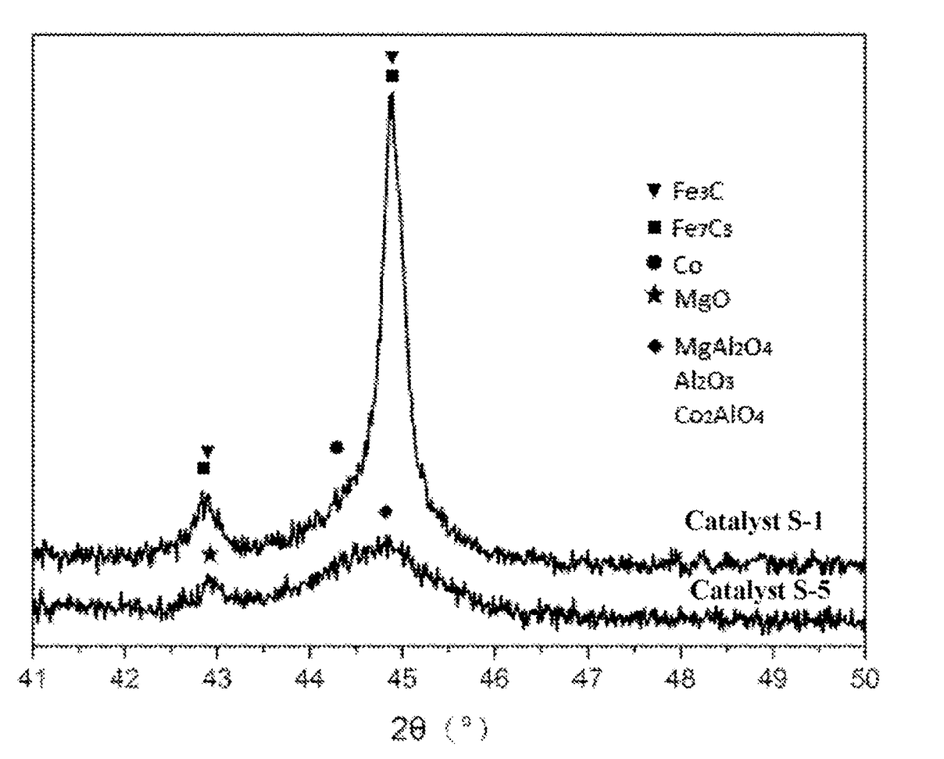
FIG. 1 is the XRD patterns of the structured monolithic catalyst for reducing NOx emission in flue gas obtained in the examples 1 and 5.

In the invention, even the first calcining in the first scheme and the second calcining in the second scheme adopt the conventional technical means in the art, it is possible to improve the catalytic conversion activity for the reduced nitrides such as $NH_3$ and the like of the structured monolithic catalyst. However, in order to further improve the catalytic conversion activity for the reduced nitrides such as $NH_3$ and the like and hydrothermal stability of the structured monolithic catalyst, the first calcining and the second calcining are preferably carried out under a carbon-containing atmosphere. The inventors of the invention have surprisingly found during the study that, when the first calcining and the second calcining are carried out under the carbon-containing atmosphere, it is possible to significantly improve both the catalytic conversion activity for the reduced nitrides such as $NH_3$ and the like and hydrothermal stability of the structured monolithic catalyst. Preferably, the present invention adopts the second scheme, wherein the second calcining is carried out under the carbon-containing atmosphere to obtain the semi-finished catalyst. It may facilitate the dispersing of the fourth metal element (noble metal element) in subsequent step. The improvement on activity may be related to the conversion of active components from oxides to carbides in reduced state, while the improvement on hydrothermal stability may be related to the fact that the treatment at high temperature facilitates the adhesion, fusion and cross-linking of active components in the catalyst. It can be seen from the comparison of the XRD spectrums that, after the treatment, there are obvious peaks for iron carbide and elemental cobalt. In particular, as shown in FIG. 1, there is a diffraction peak at 43.0° for MgO and a diffraction peak at 45.0° for $Al_2O_3$, $CO_2AlO_4$ and $MgAl_2O_4$ in the XRD spectrum of the structured monolithic catalyst S-5 which is not subjected to the treatment under a carbon-containing atmosphere. In the XRD spectrum of the composition S-1 which is subjected to the treatment under a carbon-containing atmosphere.

Not only there are a diffraction peak at 43.0° for MgO and a diffraction peak at 45.0° for $Al_2O_3$, $CO_2AlO_4$ and $MgAl_2O_4$, but also the diffraction peaks at about 43.0° and 45.0° become substantially stronger and shift to the left. It may be attributable to the fact that, for the structured monolithic catalyst S-1 subjected to the treatment under a carbon-containing atmosphere, there are diffraction peaks at 42.6° and 44.9°, wherein the diffraction peaks at 42.6° and 44.9° are for iron carbides ($Fe_3C$ and $Fe_7C_3$). In addition, for the structured monolithic catalyst S-1, there is a diffraction peak at 2θ of 44.2°, wherein the diffraction peak at 44.2° is for elemental cobalt.

It should be noted that FIG. 1 only shows the XRD spectrum in the range of 41°-50°, which is mainly used to show the forms of Fe and Co presented in the structured monolithic catalyst. In the ranges out of 41°-50°, there are other diffraction peaks, for example, at 2θ of 37°, 59° and 65° for FeO, at 2θ of 31°, 37° and 65° for COO, which are not further explained in the invention.

According to a preferred embodiment of the invention, the first calcining and the second calcining are independently performed under a carbon-containing atmosphere at a temperature of 400-1000° C., preferably 450-650° C., for 0.1-10 h, preferably 1-3 h.

There is not any special limitation on the pressure used during the first and second calcining. Each of the calcinings may be performed under a normal pressure, for example, 0.01-1 MPa (absolute pressure).

In the invention, the carbon-containing atmosphere is provided by a carbon-element-containing gas. Preferably, the carbon-element-containing gas is selected from the group consisting of carbon-element-containing gases having reductivity, further preferably at least one selected from the group consisting of CO, methane and ethane, most preferably CO.

In the invention, the carbon-element-containing gas may further comprise some inert gases, wherein the inert gas may be various inert gases commonly used in the art. Preferably, the inert gas is at least one selected from the group consisting of nitrogen, argon and helium, and further preferably nitrogen.

According to a preferred embodiment of the invention, the carbon-containing atmosphere is a mixed gas containing CO and nitrogen, wherein the volume concentration of CO in the carbon-containing atmosphere is preferably about 1-20%, further preferably about 4-10%. By using the preferred embodiment of the invention, not only the processing requirements may be better satisfied, but also the safety of operators may be ensured.

In the invention, the first calcining and the second calcining may be independently operated in a calcination furnace, which may be a rotary calcination furnace used in the production of catalytic cracking catalysts and promoters. The carbon-element-containing gas contacts solid materials in the calcination furnace in countercurrent.

In the invention, the terms "first", "second" and "third" do not limit the calcinings in any way, but are only used to distinguish the calcinings in different steps of different schemes.

In the step c) of the second scheme, the product obtained from the coating step may only be subjected to drying, may only be subjected to the third calcining, or may be subjected to drying and then the third calcining. There is not any special limitation on it in the invention. Preferably, the product obtained from the coating step is subjected to drying and then the third calcining. There is not any special limitation on the conditions of the third calcining in the invention. It may be operated according to the conventional means in the art. For example, the third calcining may be performed under an air or inert gas (such as nitrogen) atmosphere. There is not any special limitation on the conditions of the third calcining in the invention. The conditions of the third calcining may include a temperature of 300-550° C. for 1-10 h.

There is not any special limitation on the conditions of the dryings in the step (2) of the first scheme, and the step b) and step c) of the second scheme in the invention. It may be operated according to the conventional means in the art. For example, the conditions of the dryings in the step (2) of the first scheme, and the step b) and step c) of the second scheme may independently include a temperature of 60-150° C. for 2-10 h.

Preferably, in the method in accordance with the present invention, the coating step may lead to a catalyst wherein, based on the total weight of the catalyst, the coating of active components is presented in an amount of about 10-50 wt %, preferably about 15-40 wt %, further preferably about 20-35 wt %, and most preferably about 20-30 wt %. Keep it in mind, those skilled persons in the art may adjust the amount of the coating of active components by controlling the parameters of the coating step, for example, the amount of the coating slurry and the structured monolithic carrier used in the coating step.

In the method in accordance with the present invention, the coating may be any coating method that can apply the slurry on the inner surface and/or the outer surface of the structured monolithic carrier. The coating method may be aqueous coating, impregnation or spraying. There is not any special limitation on the repeating times of the coating step in the invention. It is possible to repeat the coating step. The repeating times of the coating step may be selected according to the amount of the coating of active components in the catalyst. The specific operation of coating may be identified by referring to the method described in CN1199733C. Preferably, the coating step is an aqueous coating wherein one end of the carrier is immersed in the slurry and the other end is applied with vacuum, so that the slurry continuously passes through the channels of the carrier. The slurry passing through the channels of the carrier may be in a volume of about 2-20 times of the volume of the carrier. The vacuum may be from about-0.1 MPa to about-0.01 MP. The coating may be at a temperature of about 10-70° C. for about 0.1-300 seconds. The coated structured monolithic catalyst may be subjected to drying to obtain the coating on the inner and/or outer surface of the structured monolithic carrier.

In the invention, the amounts of the source of the substrate, the precursor of the first metal element, the precursor of the second metal element, the precursor of the third metal element and the precursor of the fourth metal element may be selected over a broad range. Preferably, the source of the substrate, the precursor of the first metal element, the precursor of the second metal element, the precursor of the third metal element and the precursor of the fourth metal element are used in amounts such that in the obtained catalyst, based on the total weight of the coating of the active components, the source of the substrate is in an amount of about 10-90% by weight, and on an oxide basis, the first metal element is in an amount of about 0.5-50% by weight, the second metal element is in an amount of about 0.5-20% by weight, the third metal element is in an amount of about 0.5-20% by weight, and on an element basis, the fourth metal element is in an amount of about 0.001-0.15% by weight. Preferably, based on the total weight of the coating of the active components, the source of the substrate is in an amount of about 50-90% by weight, and on an oxide basis, the first metal element is in an amount of about 3-30% by weight, the second metal element is in an amount of about 1-20% by weight, the third metal element is in an amount of about 1-10% by weight, and on an element basis, the fourth metal element is in an amount of about 0.005-0.1% by weight. Further preferably, based on the total weight of the coating of the active components, the source of the substrate is in an amount of about 55-85% by weight, and on an oxide basis, the first metal element is in an amount of about 5-25% by weight, the second metal element is in an amount of about 5-15% by weight, the third metal element is in an amount of about 2-8% by weight, and on an element basis, the fourth metal element is in an amount of about 0.01-0.08% by weight. Most preferably, based on the total weight of the coating of the active components, the source of the substrate is in an amount of about 66-85% by weight, and on an oxide basis, the first metal element is in an amount of about 6-16% by weight, the second metal element is in an amount of about 5-12% by weight, the third metal element is in an amount of about 3-8% by weight, and on an element basis, the fourth metal element is in an amount of about 0.05-0.07% by weight.

Preferably, in the method in accordance with the present invention, the mass ratio of the amount of the source of the substrate on an oxide basis, the amount of the precursor of the first metal element on an oxide basis of the non-noble metal elements of the Group VIII, the amount of the precursor of the second metal element on an oxide basis of the metal elements of the Group IA and/or IIA, the amount of the precursor of the third metal element on an oxide basis of the non-noble metal elements of the Groups IB to VIIB, and the amount of the precursor of the fourth metal element on an element basis of the noble elements may be about 10-90: 0.5-50:0.5-20:0.5-20:0.001-0.15, preferably about 50-90:3-30:1-20:1-10:0.005-0.1; further preferably, about 55-85:5-25:5-15:2-8:0.01-0.08, and more preferably about 66-85:6-16:5-12:3-8:0.05-0.07.

According to a preferred embodiment of the invention, the precursor of the first metal element comprises precursor of Fe and precursor of Co in an amount so that the obtained catalyst comprises, on an oxide basis, Fe and Co in a weight ratio of about 1:(0.1-10), further preferably about 1:(0.3-3), further more preferably about 1:(0.5-2), most preferably about 1: (0.6-1).

In the third aspect in accordance with the present invention, it is provided a structured monolithic catalyst for reducing NOx emission in flue gas, prepared by the above method. The catalyst comprises: a structured monolithic carrier and a coating of active components disposed on inner surface and/or outer surface of the structured monolithic carrier, wherein, based on the total weight of the catalyst, the coating of active components is presented in an amount of about 10-50 wt %, wherein the coating of active components comprises active metal components and a substrate, wherein the active metal components comprise a first metal element, a second metal element, a third metal element and a fourth metal element, wherein the first metal element is selected from the group consisting of the non-noble metal elements of the Group VIII, wherein the first metal element includes Fe and Co, wherein the weight ratio of Fe and Co is about 1:(0.05-20) on an oxide basis, wherein the second metal element is at least one selected from the group consisting of the metal elements of the Group IA and/or IIA, wherein the third metal element is at least one selected from the group consisting of the non-noble metal elements of the Groups IB to VIIB, and wherein the fourth metal element is at least one selected from the group consisting of the noble metal elements. The structured monolithic catalyst prepared by the above method is the same as the structured monolithic catalyst in accordance with the present invention in any technical features. Please refer to the previous disclosures on the structured monolithic catalyst for details.

The structured monolithic catalyst for reducing NOx emission in flue gas in accordance with the present invention is suitable for various working conditions, has high catalytic conversion activity for reduced nitride, good hydrothermal stability and is simple for preparation, and can effectively reduce NOx emission in an incomplete regeneration flue gas when used in catalytic cracking process. Accordingly, in the fourth aspect in accordance with the present invention, it is provided a use of the structured monolithic catalyst for reducing NOx emission in flue gas in treating an incomplete regeneration flue gas from catalytic cracking process.

In the fifth aspect in accordance with the present invention, it is provided a method for treating an incomplete regeneration flue gas, comprising the step of contacting the incomplete regeneration flue gas with a catalyst, wherein the catalyst is the structured monolithic catalyst for reducing NOx emission in flue gas in accordance with the present invention.

There is not any special limitation on the composition of the incomplete regeneration flue gas. The incomplete regeneration flue gas may be those obtained from an incomplete regeneration catalytic cracking device. Preferably, the incomplete regeneration flue gas may comprise $O_2$ in a volume content of not more than about 0.1%, CO in a volume content of not less than about 4%, $NH_3$ in a content of less than about 200 ppm, and NOx in a content of not more than about 10 ppm. In the incomplete regeneration, the regeneration flue gas at the outlet of regenerator comprises excess oxygen in a low content, CO in a high concentration, NOx in a very low concentration, but high concentration of reduced nitrides such as $NH_3$, HCN and the like. Those reduced nitrides flow downstream along with the flue gas to a CO burner for energy recovery, in which, if they are fully oxidized, NOx is formed. Accordingly, the contacting of the incomplete regeneration flue gas with the catalyst is preferably carried out in a CO burner and/or a flue gas channel before the CO burner, more preferably the contacting is carried out in a flue gas channel before the CO burner. That is, reduced nitrides may be removed before they are oxidized. Supplementary air is usually introduced into CO burner. In absence of the catalyst, the reduced nitride is easy to be oxidized to produce NOx. In order to prevent oxidation of the reduced nitrides, preferably, when the contacting is carried out in CO burner, the contacting is preferably in the front of the CO burner. Most preferably, the contacting of the incompletely regenerated flue gas with the catalyst is carried out in the flue gas channel before the CO burner. That is, the catalyst is placed in the flue gas channel before the CO burner. The incomplete regeneration flue gas is in a oxygen-lean state in the flue gas channel. Accordingly, contacting the incomplete regeneration flue gas with the catalyst in the flue gas channel is more advantageous for the catalytic conversion of the reduced nitride, such as $NH_3$ and the like.

The catalyst for treating incomplete regeneration flue gas in the prior art is provided in form of promoter microspheres in a fluidized bed of a regenerator, so that the incomplete regeneration flue gas may sufficiently contact with the catalyst to achieve the effect of reducing NOx emission.

In the invention, unless specially indicated, ppm is by volume.

There is not any special limitation on the type of CO burner. Various CO burners commonly used in the art may be used, such as a vertical CO burner or a horizontal CO burner.

In the invention, the conditions of the contacting preferably include at a temperature of about 600-1000° C., a pressure of about 0-0.5 MPa (gauge pressure), and a mass space velocity of flue gas of about 100-1500 $h^{-1}$. Further preferably, the conditions of the contacting include at a temperature of about 650-850° C., a pressure of about 0.1-0.3 MPa, and a mass space velocity of flue gas of about 500-1200 $h^{-1}$. Without special limitation, the mass space velocity of flue gas herein is calculated in relative to the coating of active components in the structured monolithic catalyst. That is, it is the mass of the flue gas passing through unit mass of the coating of active components in unit time.

Preferably, the structured monolithic catalyst is provided in form of a catalyst bed. In the method for treating an incomplete regeneration flue gas in accordance with the present invention, the structured monolithic catalyst may be provided as a fixed catalyst bed in a CO burner and/or flue gas channels before the CO burner, wherein the flowing incomplete regeneration flue gas passes through the structured monolithic catalyst beds, i.e. through the channels in the structured monolithic carrier, and reacts with the coating of active components disposed on the wall of the channels.

The method in accordance with the present invention further comprises energy recovering. The energy recovering may be operated according to the conventional means in the art. In particular, the incomplete regeneration flue gas obtained from an incomplete regeneration catalytic cracking device is passed through a cyclone separator (preferably through a two-stage cyclone separator and a three-stage cyclone separator in sequence) to separate part of the catalyst fine powder carried therein, and then sent to a flue gas turbine. The flue gas turbine is connected with a main fan. The flue gas turbine provides expansion power to drive the main fan so as to recover the pressure energy and heat energy in the incomplete regeneration flue gas. After the energy recovering in the flue gas turbine, the incomplete regeneration flue gas is sent to the CO burner.

EXAMPLES

The implementation and beneficial effects of the invention will be described in detail through the following examples, which is intend to help the reader better understand the spirit of the invention, but not intend to limit the practicable scope of the invention.

In the examples, the amount of each component in the structured monolithic catalyst for reducing NOx emission in a flue gas was measured by X-ray fluorescence spectrometry (XRF). Reference was made to "The Analytic Method of Petrochemicals (RIPP Experimental Method", Edited by Cuiding Yang, et. al., Science Press, 1990).

In the examples, the XRD spectrum of the structured monolithic catalyst for reducing NOx emission in a flue gas was measured on a X-ray diffractometer (Siemens D5005) to determine the structure. The conditions thereof included: Cu target, Kα radiation, solid detector, tube voltage of 40 kV, tube current of 40 mA.

The raw materials used in the examples and the comparative examples included: cobalt nitrate ($Co(NO_3)_2 \cdot 6H_2O$) in analytical pure, iron nitrate ($Fe(NO_3)_3 \cdot 9H_2O$) in analytical pure, potassium permanganate ($KMnO_4$) in analytical pure, magnesium oxide (MgO) in analytical pure, all available from Sinopharm Group Chemical Reagent Co., Ltd.; ruthenium chloride ($RuCl_3$) in analytical pure, with a Ru content ≥37%, available from GRIKIN Advanced Material Co., Ltd; pseudo boehmite, an industrial grade product, with an alumina content of 64% by weight and pore volume of 0.31 ml/g, produced by Shandong Company of Aluminum Corporation of China Limited; hydrochloric acid, with a concentration of 36.5% by weight, analytical pure, available from Beijing chemical works; carbon monoxide, with a concentration of 10% by volume, with nitrogen as balance gas, available from Beijing AP BAIF gas Industrial Co., Ltd..

The coating involved in the following examples and comparative examples was aqueous coating, which specially included: during each run of coating, immersing one end of the structured monolithic carrier (or the semi-finished catalyst) in the coating slurry of active components (or the first slurry, the solution comprising the precursor of the fourth metal element) and applying vacuum on the other end, so that the slurry continuously passes through the channels in the carrier. The vacuum was −0.03 MPa. The coating was at a temperature of 35° C.

Example 1

(1) 262 g pseudo boehmite was added to 1.42 kg deionized water and dispersed to make a slurry. To the slurry, 23.8 mL hydrochloric acid was added to acidize for 15 min, to obtain an alumina gel. On a metal oxide basis, 6 g iron nitrate (calculated in $Fe_2O_3$), 6 g cobalt nitrate (calculated in $CO_2O_3$), 10 g $KMnO_4$ (calculated in MnO) and 9.6 mL of a $RuCl_3$ solution with the mass content of 12.5 g/L on the metal element basis were added to 350 mL water, stirred until fully dissolved, and then the alumina gel was added thereto, stirred for another 15 min to obtain a first solution. 10 g MgO were added to 30 g water, stirred for 10 min, and then added to the first solution, stirred for another 20 min to obtain a coating slurry of active components.

(2) A cordierite honeycomb carrier (with a pore density of 400 pores/square inch and an opening rate in the cross section of 70%, and pores in square shape) was coated with the coating slurry of active components obtained in step (1). After drying (100° C., 4 h), the obtained cordierite honeycomb carrier was transferred to a tubular furnace, to which a mixture of CO and $N_2$ with a CO concentration of 10 vol % was introduced at a flow rate of 100 mL/min, and treated at 600° C. for 1.5 h to obtain a coating of active components disposed on the inner surface and/or outer surface of the structured monolithic carrier, to obtain a structured monolithic catalyst S-1, wherein based on the total weight of the structured monolithic catalyst, the coating of active components was in an amount of 25 wt %.

The test results of the content of each component in the coating of active components of the structured monolithic catalyst S-1 were listed in Table 1.

The structured monolithic catalyst S-1 was analyzed by XRD, and the XRD spectrum was shown in FIG. 1. As shown in FIG. 1, there were a diffraction peak at about 43.0° for MgO and a diffraction peak at about 45.0° for $Al_2O_3$, $CO_2AlO_4$ and $MgAl_2O_4$ in the XRD spectrum of the structured monolithic catalyst S-5 which was not subjected to the treatment under a carbon-containing atmosphere. In the XRD spectrum of the structured monolithic catalyst S-1 which was subjected to the treatment under a carbon-containing atmosphere, not only there were a diffraction peak at about 43.0° for MgO and a diffraction peak at about 45.0° for $Al_2O_3$, $CO_2AlO_4$ and $MgAl_2O_4$, but also the diffraction peaks at about 43.0° and at about 45.0° became substantially stronger and shifted to the left. It might be attributable to the fact that, for the structured monolithic catalyst S-1 subjected to the treatment under a carbon-containing atmosphere, there were diffraction peaks at 42.6° and 44.9°, wherein the diffraction peaks at 42.6° and 44.9° were for iron carbides ($Fe_3C$ and $Fe_7C_3$). In addition, for the structured monolithic catalyst S-1, there was a diffraction peak at 2θ of 44.2°, wherein the diffraction peak at 44.2° was for elemental cobalt.

It should be noted that FIG. 1 only shows the XRD spectrum in the range of 41°-50°, which is mainly used to show the forms of Fe and Co presented in the structured monolithic catalyst. In the ranges out of 41°-50°, there are other diffraction peaks, for example, at 2θ of 37°, 59° and 65° for FeO, at 2θ of 31°, 37° and 65° for CoO. The diffraction peaks out of the range of 41°-50° are not related to the diffraction peaks for iron carbides and elemental cobalt, which are not further explained in the invention.

Example 2

(1) 253 g pseudo boehmite was added to 1.37 kg deionized water and dispersed to make a slurry. To the slurry, 22.9 mL hydrochloric acid was added to acidize for 15 min, to obtain an alumina gel. On a metal oxide basis, 10 g iron nitrate (calculated in $Fe_2O_3$), 6 g cobalt nitrate (calculated in $CO_2O_3$), 6 g $KMnO_4$ (calculated in MnO) and 8.8 mL of a $RuCl_3$ solution with the mass content of 12.5 g/L on the metal element basis were added to 350 mL water, stirred until fully dissolved, and then the alumina gel was added thereto, stirred for another 15 min to obtain a first solution. 16 g MgO were added to 48 g water, stirred for 10 min, and then added to the first solution, stirred for another 20 min to obtain a coating slurry of active components.

(2) A cordierite honeycomb carrier (with a pore density of 400 pores/square inch and an opening rate in the cross section of 70%, and pores in square shape) was coated with the coating slurry of active components obtained in step (1). After drying (100° C., 4 h), the obtained cordierite honeycomb carrier was transferred to a tubular furnace, to which a mixture of CO and $N_2$ with a CO concentration of 10 vol % was introduced at a flow rate of 100 mL/min, and treated at 500° C. for 3 h to obtain a coating of active components disposed on the inner surface and/or outer surface of the structured monolithic carrier, to obtain a structured monolithic catalyst S-2, wherein based on the total weight of the structured monolithic catalyst, the coating of active components was in an amount of 30 wt %.

The test results of the content of each component in the coating of active components of the structured monolithic catalyst S-2 were listed in Table 1.

The structured monolithic catalyst S-2 had XRD test results similar to the example 1. In the XRD spectrum of the structured monolithic catalyst S-2 which was subjected to the treatment under a carbon-containing atmosphere, not only there were a diffraction peak at about 43.0° for MgO and a diffraction peak at about 45.0° for $Al_2O_3$, $CO_2AlO_4$ and $MgAl_2O_4$, but also the diffraction peaks at about 43.0° and at about 45.0° became substantially stronger and shifted to the left. It might be attributable to the fact that, for the structured monolithic catalyst S-2 subjected to the treatment under a carbon-containing atmosphere, there were diffraction peaks at 42.6° and 44.9°, wherein the diffraction peaks at 42.6° and 44.9° were for iron carbides ($Fe_3C$ and $Fe_7C_3$). In addition, for the structured monolithic catalyst S-2, there was a diffraction peak at 2θ of 44.2°, wherein the diffraction peak at 44.2° was for elemental cobalt.

Example 3

(1) 209 g pseudo boehmite was added to 1.13 kg deionized water and dispersed to make a slurry. To the slurry, 19.0 mL hydrochloric acid was added to acidize for 15 min, to obtain an alumina gel. On a metal oxide basis, 20 g iron nitrate (calculated in $Fe_2O_3$), 12 g cobalt nitrate (calculated in $CO_2O_3$), 10 g $KMnO_4$ (calculated in MnO) and 10.4 mL of a $RuCl_3$ solution with the mass content of 12.5 g/L on the metal element basis were added to 350 mL water, stirred until fully dissolved, and then the alumina gel was added thereto, stirred for another 15 min to obtain a first solution. 24 g MgO were added to 72 g water, stirred for 10 min, and then added to the first solution, stirred for another 20 min to obtain a coating slurry of active components.

(2) A cordierite honeycomb carrier (with a pore density of 400 pores/square inch and an opening rate in the cross section of 70%, and pores in square shape) was coated with the coating slurry of active components obtained in step (1). After drying (100° C., 4 h), the obtained cordierite honeycomb carrier was transferred to a tubular furnace, to which a mixture of CO and $N_2$ with a CO concentration of 10 vol % was introduced at a flow rate of 100 mL/min, and treated at 650° C. for 1 h to obtain a coating of active components disposed on the inner surface and/or outer surface of the structured monolithic carrier, to obtain a structured monolithic catalyst S-3, wherein based on the total weight of the structured monolithic catalyst, the coating of active components was in an amount of 20 wt %.

The test results of the content of each component in the coating of active components of the structured monolithic catalyst S-3 were listed in Table 1.

The structured monolithic catalyst S-3 had XRD test results similar to the example 1. In the XRD spectrum of the structured monolithic catalyst S-3 which was subjected to the treatment under a carbon-containing atmosphere, not only there were a diffraction peak at about 43.0° for MgO and a diffraction peak at about 45.0° for $Al_2O_3$, $CO_2AlO_4$ and $MgAl_2O_4$, but also the diffraction peaks at about 43.0° and at about 45.0° became substantially stronger and shifted to the left. It might be attributable to the fact that, for the structured monolithic catalyst S-3 subjected to the treatment under a carbon-containing atmosphere, there were diffraction peaks at 42.6° and 44.9°, wherein the diffraction peaks at 42.6° and 44.9° were for iron carbides ($Fe_3C$ and $Fe_7C_3$). In addition, for the structured monolithic catalyst S-3, there was a diffraction peak at 2θ of 44.2°, wherein the diffraction peak at 44.2° was for elemental cobalt.

Example 4 a) 262 g pseudo boehmite was added to 1.42 kg deionized water and dispersed to make a slurry. To the slurry, 23.8 mL hydrochloric acid was added to acidize for 15 min, to obtain an alumina gel. On a metal oxide basis, 6 g iron nitrate (calculated in $Fe_2O_3$), 6 g cobalt nitrate (calculated in $CO_2O_3$) and 10 g $KMnO_4$ (calculated in MnO) were added to 350 mL water, stirred until fully dissolved, and then the alumina gel was added thereto, stirred for another 15 min to obtain a first solution. 10 g MgO were added to 30 g water, stirred for 10 min, and then added to the first solution, stirred for another 20 min to obtain a first slurry.

b) A cordierite honeycomb carrier (with a pore density of 400 pores/square inch and an opening rate in the cross section of 70%, and pores in square shape) was coated with the first slurry obtained in step a). After drying (100° C., 4 h), the obtained cordierite honeycomb carrier was transferred to a tubular furnace, to which a mixture of CO and $N_2$ with a CO concentration of 10 vol % was introduced at a flow rate of 100 mL/min, and treated at 600° C. for 1.5 h to obtain a semi-finished catalyst.

c) The semi-finished catalyst obtained in the step b) was coated with 30 mL of a $RuCl_3$ solution (wherein the solution comprised elemental Ru in an amount of 0.12 g), dried at 100° for 4 h, and calcined at 400° C. for 2 h to obtain a coating of active components disposed on the inner surface and/or outer surface of the structured monolithic carrier, to obtain a structured monolithic catalyst S-4, wherein based on the total weight of the structured monolithic catalyst, the coating of active components was in an amount of 25 wt %.

The test results of the content of each component in the coating of active components of the structured monolithic catalyst S-4 were listed in Table 1.

The structured monolithic catalyst S-4 had XRD test results similar to the example 1. In the XRD spectrum of the structured monolithic catalyst S-4 which was subjected to the treatment under a carbon-containing atmosphere, not only there were a diffraction peak at about 43.0° for MgO and a diffraction peak at about 45.0° for $Al_2O_3$, $CO_2AlO_4$ and $MgAl_2O_4$, but also the diffraction peaks at about 43.0° and at about 45.0° became substantially stronger and shifted to the left. It might be attributable to the fact that, for the structured monolithic catalyst S-4 subjected to the treatment under a carbon-containing atmosphere, there were diffraction peaks at 42.6° and 44.9°, wherein the diffraction peaks at 42.6° and 44.9° were for iron carbides ($Fe_3C$ and $Fe_7C_3$). In addition, for the structured monolithic catalyst S-4, there was a diffraction peak at 2θ of 44.2°, wherein the diffraction peak at 44.2° was for elemental cobalt.

Example 5

The example 1 was repeated except that the mixture of CO and $N_2$ with a CO concentration of 10 volume % was replaced with air, to obtain the structured monolithic catalyst 5.

The test results of the content of each component in the structured monolithic catalyst S-5 were listed in Table 1. The structured monolithic catalyst S-5 was analyzed by XRD. It could be seen from the XRD spectrum (as shown in FIG. 1) that there was not obvious diffraction peaks at 2θ of 42.6°, 44.2° and 44.9°, which shown that all of Fe and Co in the structured monolithic catalyst S-5 were presented in form of oxides.

Example 6

The example 1 was repeated except that on a metal oxide basis, MgO was replaced with CaO in the same amount, to obtain the structured monolithic catalyst S-6.

The test results of the content of each component in the structured monolithic catalyst S-6 were listed in Table 1. The structured monolithic catalyst S-6 had XRD test results similar to the example 1. In the XRD spectrum of the structured monolithic catalyst S-6 which was subjected to the treatment under a carbon-containing atmosphere, there were diffraction peaks at 42.6° and 44.9°, wherein the diffraction peaks at 42.6° and 44.9° were for iron carbides ($Fe_3C$ and $Fe_7C_3$). In addition, for the structured monolithic catalyst S-6, there was a diffraction peak at 2θ of 44.2°, wherein the diffraction peak at 44.2° was for elemental cobalt.

Example 7

The example 1 was repeated except that on a metal oxide basis, $KMnO_4$ was replaced with $CeCl_2$ in the same amount, to obtain the structured monolithic catalyst S-7.

The test results of the content of each component in the structured monolithic catalyst S-7 were listed in Table 1. The structured monolithic catalyst S-7 had XRD test results similar to the example 1. In the XRD spectrum of the structured monolithic catalyst S-7 which was subjected to the treatment under a carbon-containing atmosphere, not only there were a diffraction peak at about 43.0° for MgO and a diffraction peak at about 45.0° for $Al_2O_3$, $CO_2AlO_4$ and $MgAl_2O_4$, but also the diffraction peaks at about 43.0° and at about 45.0° became substantially stronger and shifted to the left. It might be attributable to the fact that, for the structured monolithic catalyst S-7 subjected to the treatment under a carbon-containing atmosphere, there were diffraction peaks at 42.6° and 44.9°, wherein the diffraction peaks at 42.6° and 44.9° were for iron carbides ($Fe_3C$ and $Fe_7C_3$). In addition, for the structured monolithic catalyst S-7, there was a diffraction peak at 2θ of 44.2°, wherein the diffraction peak at 44.2° was for elemental cobalt.

Example 8

The example 1 was repeated except that on a metal oxide basis, iron nitrate was used in an amount of 3 g and cobalt nitrate was used in an amount of 9 g, to obtain the structured monolithic catalyst S-8.

The test results of the content of each component in the structured monolithic catalyst S-8 were listed in Table 1. The structured monolithic catalyst S-8 had XRD test results similar to the example 1. In the XRD spectrum of the structured monolithic catalyst S-8 which was subjected to the treatment under a carbon-containing atmosphere, not only there were a diffraction peak at about 43.0° for MgO and a diffraction peak at about 45.0° for $Al_2O_3$, $CO_2AlO_4$ and $MgAl_2O_4$, but also the diffraction peaks at about 43.0° and at about 45.0° became substantially stronger and shifted to the left. It might be attributable to the fact that, for the structured monolithic catalyst S-8 subjected to the treatment under a carbon-containing atmosphere, there were diffraction peaks at 42.6° and 44.9°, wherein the diffraction peaks at 42.6° and 44.9° were for iron carbides ($Fe_3C$ and $Fe_7C_3$). In addition, for the structured monolithic catalyst S-8, there was a diffraction peak at 2θ of 44.2°, wherein the diffraction peak at 44.2° was for elemental cobalt.

Example 9

The example 1 was repeated except that on a metal oxide basis, iron nitrate was used in an amount of 9 g and cobalt nitrate was used in an amount of 3 g, to obtain the structured monolithic catalyst S-9.

The test results of the content of each component in the structured monolithic catalyst S-9 were listed in Table 1. The structured monolithic catalyst S-9 had XRD test results similar to the example 1. In the XRD spectrum of the structured monolithic catalyst S-9 which was subjected to the treatment under a carbon-containing atmosphere, not only there were a diffraction peak at about 43.0° for MgO and a diffraction peak at about 45.0° for $Al_2O_3$, $CO_2AlO_4$ and $MgAl_2O_4$, but also the diffraction peaks at about 43.0° and at about 45.0° became substantially stronger and shifted to the left. It might be attributable to the fact that, for the structured monolithic catalyst S-9 subjected to the treatment under a carbon-containing atmosphere, there were diffraction peaks at 42.6° and 44.9°, wherein the diffraction peaks at 42.6° and 44.9° were for iron carbides ($Fe_3C$ and $Fe_7C_3$). In addition, for the structured monolithic catalyst S-9, there was a diffraction peak at 2θ of 44.2°, wherein the diffraction peak at 44.2° was for elemental cobalt.

Example 10

The example 1 was repeated except that the mixture of CO and $N_2$ with a CO concentration of 10 volume % was replaced with a mixture of ethane and nitrogen with an ethane concentration of 10 volume %, to obtain the structured monolithic catalyst 10.

The test results of the content of each component in the structured monolithic catalyst S-10 were listed in Table 1. The structured monolithic catalyst S-10 had XRD test results similar to the example 1. In the XRD spectrum of the structured monolithic catalyst S-10 which was subjected to the treatment under a carbon-containing atmosphere, not only there were a diffraction peak at about 43.0° for MgO and a diffraction peak at about 45.0° for $Al_2O_3$, $CO_2AlO_4$ and $MgAl_2O_4$, but also the diffraction peaks at about 43.0° and at about 45.0° became substantially stronger and shifted to the left. It might be attributable to the fact that, for the structured monolithic catalyst S-10 subjected to the treatment under a carbon-containing atmosphere, there were diffraction peaks at 42.6° and 44.9°, wherein the diffraction peaks at 42.6° and 44.9° were for iron carbides ($Fe_3C$ and $Fe_7C_3$). In addition, for the structured monolithic catalyst S-10, there was a diffraction peak at 2θ of 44.2°, wherein the diffraction peak at 44.2° was for elemental cobalt.

Example 11

The example 1 was repeated except that the cordierite honeycomb carrier used had a pore density of 40 pores/square inch and an opening rate in the cross section of 70%, and pores in square shape. A structured monolithic catalyst 11 was obtained, wherein based on the total weight of the structured monolithic catalyst, the coating of active components was in an amount of 7 wt %.

Example 12

The example 1 was repeated except that the cordierite honeycomb carrier used had a pore density of 40 pores/square inch and an opening rate in the cross section of 70%, and pores in square shape. A structured monolithic catalyst 12 was obtained, wherein based on the total weight of the structured monolithic catalyst, the coating of active components was in an amount of 10 wt %.

Example 13

The example 1 was repeated except that the cordierite honeycomb carrier used had a pore density of 40 pores/square inch and an opening rate in the cross section of 70%, and pores in square shape. A structured monolithic catalyst 13 was obtained, wherein based on the total weight of the structured monolithic catalyst, the coating of active components was in an amount of 15 wt %.

Comparative Example 1

The example 1 was repeated except that on a metal oxide basis, cobalt nitrate was replaced with iron nitrate in the same amount, to obtain a structured monolithic catalyst D-1.

The test results of the content of each component in the structured monolithic catalyst D-1 were listed in Table 1.

Comparative Example 2

The example 1 was repeated except that on a metal oxide basis, iron nitrate was replaced with cobalt nitrate in the same amount, to obtain a structured monolithic catalyst D-2.

The test results of the content of each component in the structured monolithic catalyst D-2 were listed in Table 1.

Comparative Example 3

34.4 g of dried γ-alumina microsphere carrier was weighted, impregnated with a solution composed of 10.09 g cerium nitrate, 2.13 g lanthanum nitrate, 2.7 g copper nitrate and 18 mL water, dried at 120° C. and then calcined at 600° C. for 1 hour, to obtain a catalyst precursor. 10 g the catalyst precursor was mixed with 30 g aluminum sol (with a solid content of 21.5%) and coated on a cordierite honeycomb carrier (with a pore density of 400 pores/square inch and an opening rate in the cross section of 70%, and pores in square shape), and then subjected to drying (100° C., 4 h) and calcining (400° C., 2 h), to obtain a structured monolithic catalyst D-3, wherein based on the total weight of the structured monolithic catalyst, the coating of active components was in an amount of 25 wt %.

TABLE 1

| Catalyst No. | the first metal element Fe | the first metal element Co | the second metal element | the third metal element | the fourth metal element |
|---|---|---|---|---|---|
| Ex.1 | S-1 | 3 | 3 | 5 | 5 | 0.06 |
| CEx.1 | D-1 | 6 | — | 5 | 5 | 0.06 |
| CEx.2 | D-2 | — | 6 | 5 | 5 | 0.06 |
| Ex.2 | S-2 | 5 | 3 | 8 | 3 | 0.055 |
| Ex.3 | S-3 | 10 | 6 | 12 | 5 | 0.065 |
| Ex.4 | S-4 | 3 | 3 | 5 | 5 | 0.06 |
| Ex.5 | S-5 | 3 | 3 | 5 | 5 | 0.06 |
| Ex.6 | S-6 | 3 | 3 | 5 | 5 | 0.06 |
| Ex.7 | S-7 | 3 | 3 | 5 | 5 | 0.06 |
| Ex.8 | S-8 | 1.5 | 4.5 | 5 | 5 | 0.06 |
| Ex.9 | S-9 | 4.5 | 1.5 | 5 | 5 | 0.06 |
| Ex.10 | S-10 | 3 | 3 | 5 | 5 | 0.06 |
| Ex.11 | S-11 | 3 | 3 | 5 | 5 | 0.06 |
| Ex.12 | S-12 | 3 | 3 | 5 | 5 | 0.06 |
| Ex.13 | S-13 | 3 | 3 | 5 | 5 | 0.06 |

The contents of the first metal element, the second metal element and the third metal element were presented as percentage by weight on an oxide basis. The content of the fourth metal element was presented as percentage by weight on an element basis.

Testing Example 1

This testing example was used to show the effects of the catalysts obtained in the examples and comparative examples on reducing NOx emission in an incomplete regeneration flue gas under aerobic conditions. In particular, the structured monolithic catalysts were aged at 800° C. under 100% steam atmosphere for 12 h, and then, subjected to simulation evaluation on treating an incomplete regeneration flue gas.

The evaluation on treating an incomplete regeneration flue gas was operated on a fixed bed device simulating the reducing of NOx in the flue gas, with the structured monolithic catalysts being filled in the catalyst bed in a loading of 10 g, a reaction temperature of 650° C., and a flow rate by volume of the feed gas of 1500 mL/min. The feed gas contained 3.7% by volume of CO, 0.5% by volume of oxygen, 800 ppm $NH_3$, and balance of $N_2$. The gas products were analyzed with on-line infrared analyzer to obtain the concentrations of $NH_3$, NOx and CO after reaction. The results were listed in Table 2.

TABLE 2

| | Cat. No. | Concentration of NOx, ppm | Concentration of $NH_3$, ppm | Concentration of CO, vol.% |
|---|---|---|---|---|
| Ex. 1 | S-1 | 70 | 90 | 2.92 |
| CEx. 1 | D-1 | 131 | 209 | 2.9 |
| CEx. 2 | D-2 | 134 | 201 | 2.94 |
| CEx. 3 | D-3 | 159 | 342 | 3.15 |
| Ex. 2 | S-2 | 61 | 86 | 2.83 |
| Ex. 3 | S-3 | 42 | 44 | 2.72 |
| Ex. 4 | S-4 | 60 | 81 | 2.84 |
| Ex. 5 | S-5 | 75 | 95 | 2.89 |
| Ex. 6 | S-6 | 64 | 121 | 2.90 |
| Ex. 7 | S-7 | 69 | 117 | 2.93 |
| Ex. 8 | S-8 | 73 | 99 | 2.93 |
| Ex. 9 | S-9 | 75 | 95 | 2.91 |
| Ex. 10 | S-10 | 71 | 88 | 2.91 |
| Ex. 11 | S-11 | 85 | 105 | 2.97 |
| Ex. 12 | S-12 | 80 | 100 | 2.95 |
| Ex. 13 | S-13 | 75 | 95 | 2.93 |

It could be seen from the data in Table 2 that, when used in treating the incomplete regeneration from a catalytic cracking process under aerobic condition, the structured monolithic catalysts in accordance with the present invention had better performance of reducing $NH_3$ and NOx emissions, as compared with the catalysts obtained in the comparative examples. In addition, during the evaluation, the aged structured monolithic catalysts were used. The aged structured monolithic catalysts still achieved high activity of removing $NH_3$ and NOx. Therefore, the structured monolithic catalysts in accordance with the present invention had good hydrothermal stability.

The testing example 1 was used to simulate a process of treating an incomplete regeneration flue gas wherein the contacting of the incomplete regeneration flue gas with the structured monolithic catalysts was carried out in a CO burner. Due to the fact that supplementary air was introduced into the CO burner, the contacting was carried out in presence of oxygen. Accordingly, the flue gas used in the testing example 1 contained some oxygen. The results of the testing example 1 could prove that, when structured monolithic catalysts in accordance with the present invention contacted an incomplete regeneration flue gas in a CO burner, the structured monolithic catalysts in accordance with the present invention had higher catalytic conversion activity for reduced nitrides such as $NH_3$ and the like, as compared with the prior art.

Testing Example 2

This testing example was used to show the effects of the catalysts obtained in the examples and comparative examples on reducing NOx emission in an incomplete regeneration flue gas under oxygen-lean conditions. In particular, the structured monolithic catalysts were aged at 800° C. under 100% steam atmosphere for 12 h, and then, subjected to simulation evaluation on treating an incomplete regeneration flue gas.

The evaluation on treating an incomplete regeneration flue gas was operated on a fixed bed device simulating the reducing of NOx in the flue gas, with the structured monolithic catalysts being filled in the catalyst bed in a loading of 10 g, a reaction temperature of 650° C., and a flow rate by volume of the feed gas of 1500 mL/min. The feed gas contained 3.7% by volume of CO, 800 ppm $NH_3$, and balance of $N_2$. The gas products were analyzed with on-line infrared analyzer to obtain the concentrations of $NH_3$, NOx and CO after reaction. The results were listed in Table 3.

TABLE 3

|  | Cat. No. | Concentration of NOx, ppm | Concentration of $NH_3$, ppm | Concentration of CO, vol.% |
| --- | --- | --- | --- | --- |
| Ex. 1 | S-1 | 0 | 154 | 3.7 |
| CEx. 1 | D-1 | 0 | 369 | 3.7 |
| CEx. 2 | D-2 | 0 | 357 | 3.7 |
| CEx. 3 | D-3 | 0 | 523 | 3.7 |
| Ex. 2 | S-2 | 0 | 133 | 3.7 |
| Ex. 3 | S-3 | 0 | 83 | 3.7 |
| Ex. 4 | S-4 | 0 | 131 | 3.7 |
| Ex. 5 | S-5 | 0 | 182 | 3.7 |
| Ex. 6 | S-6 | 0 | 189 | 3.7 |
| Ex. 7 | S-7 | 0 | 197 | 3.7 |
| Ex. 8 | S-8 | 0 | 157 | 3.7 |
| Ex. 9 | S-9 | 0 | 162 | 3.7 |

TABLE 3-continued

|  | Cat. No. | Concentration of NOx, ppm | Concentration of $NH_3$, ppm | Concentration of CO, vol.% |
| --- | --- | --- | --- | --- |
| Ex. 10 | S-10 | 0 | 156 | 3.7 |
| Ex. 11 | S-11 | 0 | 190 | 3.7 |
| Ex. 12 | S-12 | 0 | 180 | 3.7 |
| Ex. 13 | S-13 | 0 | 170 | 3.7 |

It could be seen from the data in Table 3 that, when used in treating the incomplete regeneration from a catalytic cracking process under anaerobic condition, the structured monolithic catalysts in accordance with the present invention had better performance of reducing $NH_3$ emission, as compared with the catalysts obtained in the comparative examples. In addition, during the evaluation, the aged structured monolithic catalysts were used. The aged structured monolithic catalysts still achieved high activity of removing $NH_3$. Therefore, the structured monolithic catalysts in accordance with the present invention had good hydrothermal stability.

The testing example 2 was used to simulate a process of treating an incomplete regeneration flue gas wherein the contacting of the incomplete regeneration flue gas with the structured monolithic catalysts was carried out in a flue gas channel before a CO burner. Due to the fact that the flue gas channel before the CO burner was in oxygen-lean condition, the contacting was carried out almost in absence of oxygen. Accordingly, the flue gas used in the testing example 2 contained no oxygen. The results of the testing example 2 could prove that, when structured monolithic catalysts in accordance with the present invention contacted an incomplete regeneration flue gas in a flue gas channel before a CO burner, the structured monolithic catalysts in accordance with the present invention had higher catalytic conversion activity for reduced nitrides such as $NH_3$ and the like, as compared with the prior art.

The preferred embodiments of the invention have been described above. However, the present invention is not limited to the above embodiments. Within the scope of the technical concept of the present invention, various simple modifications may be made to the embodiments of the present invention, including any combination of technical features in any suitable manner. Such simple modifications and combinations should be considered as the disclosure of the present invention and thereby within the protection scope of the present invention.

The invention claimed is:

1. A method for preparing a structured monolith catalyst for reducing NOx emission in flue gas, comprising:
    (1) mixing a source of a substrate, a precursor of a first metal element, a precursor of a second metal element, a precursor of a third metal element, a precursor of a fourth metal element, and water, to obtain a coating slurry of active components, and
    (2) coating a structured monolith carrier with the coating slurry of active components, and then subjected to drying and a first calcining, to obtain a coating of active components disposed on inner surface and/or outer surface of the structured monolith carrier,
    wherein the first metal element is selected from the group consisting of the non-noble metal elements of the Group VIII, wherein the first metal element includes Fe and Co, wherein the second metal element is at least one selected from the group consisting of the metal elements of the Group IA and/or IIA, wherein the third metal element is at least one selected from the group consisting of the non-noble metal elements of the Groups IB to VIIB, and wherein the fourth metal element is at least one selected from the group consisting of the noble metal elements, wherein the precursor of the first metal element comprises precursor of Fe and precursor of Co in an amount so that the obtained catalyst comprises, on an oxide basis, Fe and Co in a weight ratio of 1:(0.05-20), and wherein the first calcining are carried out in a carbon-containing atmosphere comprising 1-20 vol % of CO.

2. The method of claim 1, wherein the first calcining is carried out at a temperature of 400-1000° C. for 0.1-10 h.

3. The method of claim 1, wherein, in the obtained structured monolith catalyst, based on a total weight of the catalyst, the coating of active components is present in an amount of 10-50 wt %, and the precursor of the second metal element, the precursor of the third metal element and the precursor of the fourth metal element are used in amounts such that in the obtained catalyst, based on the total weight of the coating of the active components, the source of the substrate is in an amount of 10-90% by weight, and on an oxide basis, the first metal element is in an amount of 0.5-50% by weight, the second metal element is in an amount of 0.5-20% by weight, the third metal element is in an amount of 0.5-20% by weight, and on an element basis, the fourth metal element is in an amount of 0.001-0.15% by weight.

4. The method of claim 1, wherein the precursor of Fe and precursor of Co are in an amount so that the obtained catalyst comprises, on an oxide basis, Fe and Co in a weight ratio of 1:(0.1-10).

5. The method of claim 1, wherein the second metal element is at least one selected from the group consisting of Na, K, Mg, and Ca, the third metal element is at least one selected from the group consisting of Cu, Zn, Ti, Zr, V, Cr, Mo, W, Mn, and rare earth elements, the fourth metal element is at least one selected from the group consisting of Pt, Ir, Pd, Ru, and Rh, and the precursor of the first metal element, the precursor of the second metal element, the precursor of the third metal element and the precursor of the fourth metal element are water-soluble salts of the first metal element, the second metal element, the third metal element, and the fourth metal element, respectively.

6. The method of claim 1, wherein the precursor of the substrate is a material from which the substrate is obtained under the conditions of the first calcining in step (2); and the substrate is at least one selected from the group consisting of alumina, silica-alumina, zeolite, spinel, kaolin, diatomite, perlite, and perovskite monolith.

7. The method of claim 1, wherein the first calcining is carried out in a carbon-containing atmosphere comprising 4-10 vol % of CO.

8. A structured monolith catalyst for reducing NOx emission in flue gas, prepared according to the method of claim 1, comprising: based on a total weight of the structured monolith catalyst, the coating of active components is present in an amount of 30-35 wt %, and, based on a total weight of the coating of active components, the substrate is in an amount of 55-85 wt %, and on an oxide basis, the first metal element is in an amount of 5-25 wt %, the second metal element is in an amount of 5-15 wt %, the third metal element is in an amount of 2-8 wt %, and on an element basis, the fourth metal element is in an amount of 0.01-0.08 wt %.

9. A method for preparing a structured monolith catalyst for reducing NOx emission in flue gas, comprising:

a) mixing a source of a substrate, a precursor of a first metal element, a precursor of a second metal element, a precursor of a third metal element, and water, to obtain a first slurry, b) coating a structured monolith carrier with the first slurry, and then subjected to drying and a second calcining, to form a coating comprising parts of active components on inner surface and/or outer surface of the structured monolith carrier, to obtain a semi-finished catalyst, and c) coating the semi-finished catalyst obtained in the step b) with a solution comprising a precursor of a fourth metal element, and then subjected to drying and/or a third calcining, to obtain the coating of active components disposed on inner surface and/or outer surface of the structured monolith carrier, wherein the first metal element is selected from the group consisting of the non-noble metal elements of the Group VIII, wherein the first metal element includes Fe and Co, wherein the second metal element is at least one selected from the group consisting of the metal elements of the Group IA and/or IIA, wherein the third metal element is at least one selected from the group consisting of the non-noble metal elements of the Groups IB to VIIB, and wherein the fourth metal element is at least one selected from the group consisting of the noble metal elements, wherein the precursor of the first metal element comprises precursor of Fe and precursor of Co in an amount so that the obtained catalyst comprises, on an oxide basis, Fe and Co in a weight ratio of 1:(0.05-20), and wherein the second calcining are carried out in a carbon-containing atmosphere comprising 1-20 vol % of CO.

10. The method of claim 9, wherein the second calcining is carried out at a temperature of 400-1000° C. for 0.1-10 h.

11. The method of claim 9, wherein, in the obtained catalyst, based on a total weight of the catalyst, the coating of active components is present in an amount of 10-50 wt %, and the precursor of the second metal element, the precursor of the third metal element and the precursor of the fourth metal element are used in amounts such that in the obtained catalyst, based on the total weight of the coating of the active components, the source of the substrate is in an amount of 10-90% by weight, and on an oxide basis, the first metal element is in an amount of 0.5-50% by weight, the second metal element is in an amount of 0.5-20% by weight, the third metal element is in an amount of 0.5-20% by weight, and on an element basis, the fourth metal element is in an amount of 0.001-0.15% by weight.

12. The method of claim 9, wherein the precursor of Fe and precursor of Co are in an amount so that the obtained catalyst comprises, on an oxide basis, Fe and Co in a weight ratio of 1:(0.1-10).

13. The method of claim 9, wherein the second metal element is at least one selected from the group consisting of Na, K, Mg, and Ca, the third metal element is at least one selected from the group consisting of Cu, Zn, Ti, Zr, V, Cr, Mo, W, Mn, and rare earth elements, the fourth metal element is at least one selected from the group consisting of Pt, Ir, Pd, Ru, and Rh, and the precursor of the first metal element, the precursor of the second metal element, the precursor of the third metal element and the precursor of the fourth metal element are water-soluble salts of the first metal element, the second metal element, the third metal element, and the fourth metal element, respectively.

14. The method of claim 9, wherein the precursor of the substrate in is a material from which the substrate is obtainable under the conditions of the second calcining in step b) and/or the third calcining in step c), and the substrate is at least one selected from the group consisting of alumina, silica-alumina, zeolite, spinel, kaolin, diatomite, perlite, and perovskite monolith.

15. The method of claim 9, wherein the second calcining is carried out in a carbon-containing atmosphere comprising 4-10 vol % of CO.

\* \* \* \* \*